United States Patent [19]

Roy et al.

[11] Patent Number: 4,829,031

[45] Date of Patent: May 9, 1989

[54] METHOD OF PREPARING CERAMIC COMPOSITIONS AT LOWER SINTERING TEMPERATURES

[75] Inventors: Rustum Roy; Sridhar Komarneni, both of State College, Pa.

[73] Assignee: Research Corporation, New York, N.Y.

[21] Appl. No.: 892,631

[22] Filed: Aug. 1, 1986

Related U.S. Application Data

[63] Continuation-in-part of Ser. No. 893,120, Aug. 1, 1986, which is a continuation-in-part of Ser. No. 546,856, Oct. 31, 1983, abandoned.

[51] Int. Cl.$^4$ .................... C04B 35/46; C04B 35/10
[52] U.S. Cl. .................... 501/134; 501/120; 501/127; 501/153; 423/600; 423/610; 423/625
[58] Field of Search ............. 501/12, 120, 134, 153, 501/127; 423/600, 610, 625, 626

[56] References Cited

U.S. PATENT DOCUMENTS

| H,189 | 1/1987 | Bauer | 423/626 X |
|---|---|---|---|
| 3,862,297 | 1/1975 | Claridge et al. | 423/615 OR |
| 4,314,827 | 2/1982 | Leitheiser et al. | 51/298 OR |
| 4,505,886 | 3/1985 | Cody et al. | 423/615 X |
| 4,543,107 | 9/1985 | Rue | 51/309 OR |
| 4,623,364 | 11/1986 | Lottringer et al. | 51/309 OR |

OTHER PUBLICATIONS

Kumagai et al., "Enhanced Densification of Boehmite Sol-Gels by α-Alumina Seeding", Comm. Amc. Cerm. Soc., Nov. 1984.

*Primary Examiner*—William R. Dixon, Jr.
*Assistant Examiner*—Karl Group
*Attorney, Agent, or Firm*—Scully, Scott, Murphy & Presser

[57] ABSTRACT

Ceramic oxide diphasic xerogels of structurally dissimilar phases (crystalline and amorphous, semicrystalline or noncrystalline) but compositionally similar phases will be converted to crystalline ceramic oxide products having enhanced densification when subjected to substantially lower sintering temperature.

1 Claim, 12 Drawing Sheets

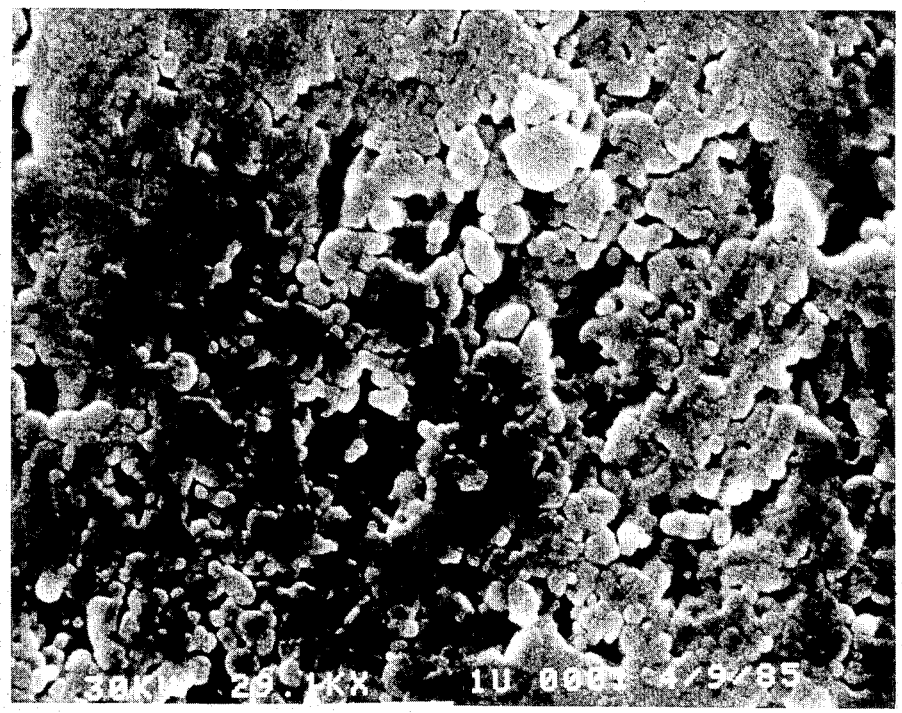
FIG.IA
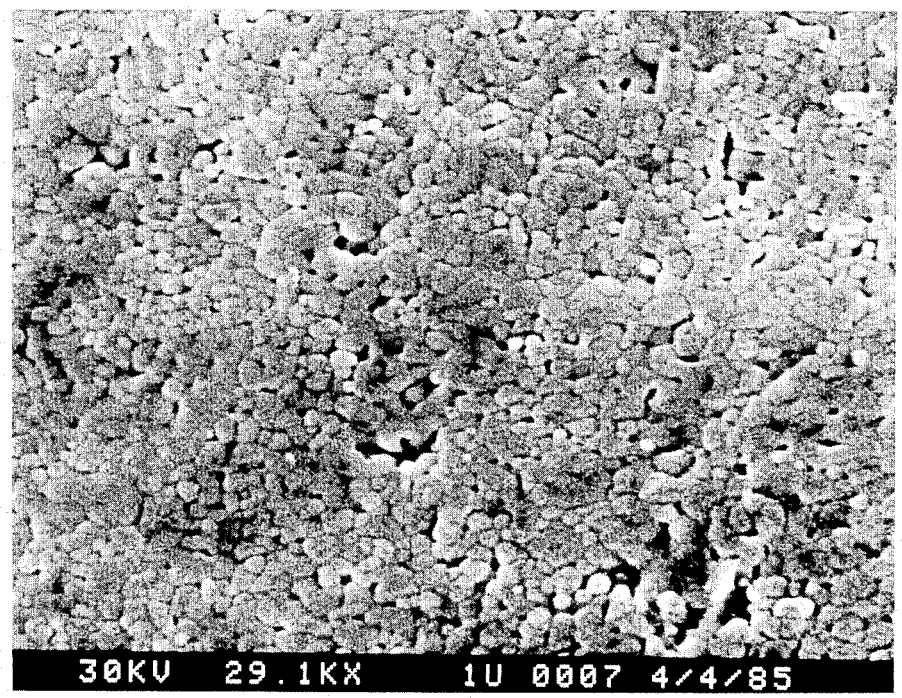
FIG.IB

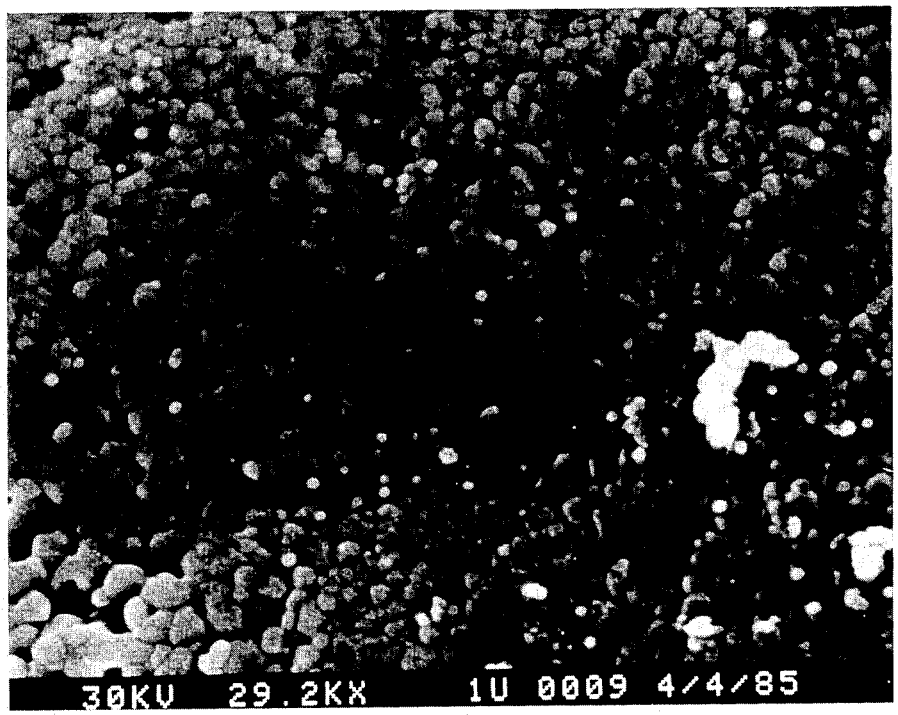
FIG. IC
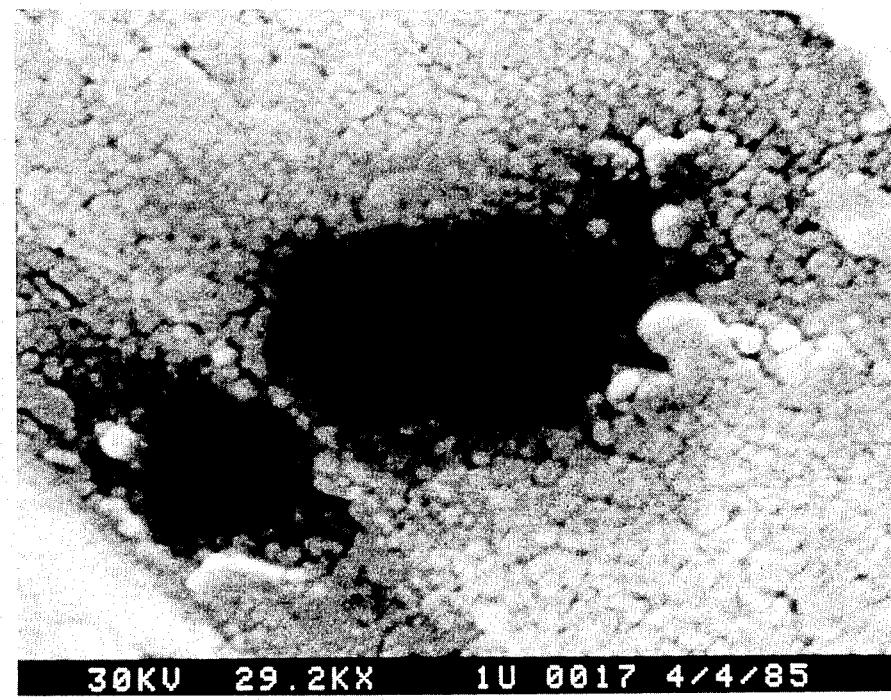
FIG. ID

METHOD OF PREPARING CERAMIC COMPOSITIONS AT LOWER SINTERING TEMPERATURES

This invention was made with Government support under AFOSR-83-0212, awarded by the Air Force, and under DMR-8119476, awarded by the National Science Foundation. The Government has certain rights in this invention.

CROSS-REFERENCE TO RELATED APPLICATION

This is a continuation-in-part of application Ser. No. 893,120, filed Aug. 1, 1986, which is a continuation-in-part of application Ser. No. 546,856, filed Oct. 31, 1983 abandoned.

BACKGROUND OF THE INVENTION

1. Field of the Invention

This invention relates to ceramic compositions and their preparation. More particularly, it relates to diphasic xerogels and their use in preparing ceramic compositions. This invention especially relates to structurally diphasic xerogels and their use in preparing ceramic compositions 2. Background of the Invention Innovative materials preparation, as recent history shows, has been the driving force behind a great deal of scientific technological innovation in materials science and engineering. The transistor-action discovery was clearly delayed until the germanium was purified sufficiently. From nylon to kevlar the polymer saga has been punctuated by the synthesis of new materials. In the ceramics age, diamond synthesis, the glass-ceramic process and product and ferrite and garnet compositional tailoring have all led to both new fields of science and of technology. In the modern ceramics processing of high-technology materials the need for ultrafine powders with controlled purity and homogeneity has become paramount. These fine powders are often metastable and hence partake of many of the advantages (stored excess free energy) of such materials. Those working in this art are concerned with the intersection of two fields of preparation science: ultrafine powders and metasable solids.

Fine powders have been prepared by such prior art techniques as co-precipitation, co-decomposition and organic hydrolysis. During the late 1940's and early 1950's, the process known as sol gel process was developed where both alkoxide and $SiO_2$-sol precursors were employed for the preparation of fine noncrystalline ceramic and ultrahomogeneous glasses. R. Roy, *J. Am. Ceram. Soc.* 39,145 (1956). The sol gel process was employed to prepare literally hundreds of compositions in the common ceramic oxide systems involving $Al_2O_3$, $SiO_2$, MgO, $TiO_2$, $GeO_2$, $ZrO_2$, $UO_2$ and the like. In recent years, a few new glassy and ceramic materials have been added to the list of materials made by the sol-gel process. Recent research in this area has instead focused on the process itself insofar as it affected the reaction kinetics and microstructure of the gel-derived solid and on specific applications such as nuclear fuel pellets, coatings, fibers, and abrasive grains. Much recent work in single component systems has studied the effect of the gelling conditions on the crystallinity, microstructure, and porosity of oxides formed by sol-gel methods. Parameters such as the amount of $H_2O$, the acidity, and the gelation temperature have been found to be crucial in this respect. In the research to date, as far as can be determined, the universal goal has been to make a single phase xerogel solid. In other words, in the gel the solid is a single phase.

Heretofore gels have also been prepared in many multi-component systems, often with four or five components. However, these gels were single phase in their xerogel form, only upon annealing and crystallization do they typically yield several phases, both metastable and stable crystalline phases.

U.S. Pat. Nos. 3,979,215; 4,052,538 and 4,246,137 disclose the preparation of multicomponent ceramic articles where the preparation method includes the formation of a gel, which in all instances is a single phase gel, followed by a drying operation for production of the desired product.

U.S. Pat. No. 3,791,967 discloses a porous xerogel of alumina and/or silica containing hydrogenation metals and a tetravalent phosphate useful as a hydrodesulfurization catalyst. The preparation includes forming a hydrous gel containing preformed phosphate particles. The gel is recovered, washed and dried to provide the catalyst. There is no suggestion of the formation of a two phase gel in the procedure.

U.S. Pat. No. 4,314,827 discloses an aluminum oide-based abrasive mineral having a microcrystalline structure of randomly oriented crystal lites comprising a continuous phase of alumina and a secondary phase dispersed therein comprising (a) zirconia and/or hafnia, (b) a spinel derived from alumina and at least one oxide of cobalt, nickel, zinc or magnesium or (c) a combination of (a) and (b). These abrasive materials are prepared by forming a homogeneous mixture in a liquid medium of an alumina source compound, such as a colloidal dispersion or a hydrosol of alumina, and a precursor of the secondary phase, converting the mixture to a gel, drying the gel to obtain a porous solid material and firing the solid material under non-reducing conditions at a temperature of at least 1250° C. to convert the solid material to the dense alumina-based abrasive mineral. No mention is made of the formation of other than a single phase gel.

The parent and grandparent patent applications of which this application is a continuation-in-part relate to the preparation of multiphasic xerogels using a sol-gel process which involves the preparation of inhomogeneous sols which are converted to multiphasic, especially diphasic xerogels. Diphasic xerogels of a ceramic oxide in combination with a metal, a metal compound or another ceramic oxide may be prepared by the procedures disclosed therein.

Thermal treatment is an essential operation in the preparation of ceramic oxide products. Typically, the thermal treatment at the lower temperature ranges of 0°–400° C. results in the removal of physically held water and organic binders and materials while thermal treatment in the upper temperature ranges, typically in the 700°–1650° C. range, provides both structural changes and compound formation. Thermal treatment in the upper ranges is often referred to in the art as "sintering." Structural changes include such changes as loss of crystallinity or the conversion from one crystalline form to another. For example, alumina crystalline structure changes with increasing sintering temperature from gamma to delta (ca. 850° C.) to theta (ca. 1060° C.) and finally to alpha-alumina (corundum) (ca. 1150° C.). As the material is treated, a temperature is reached at which a new structural arrangement is more stable, the higher form usually having higher symmetry. In addition, compounds may be formed during high temperature thermal treatment. A typical example is the formation of spinel ($MgAl_2O_4$) from its component oxides. Here, the reaction takes place in the absence of a liquid phase so that volume diffusion through the bulk material determines the reaction rate.

Improvements in the thermal treatment portion of ceramic oxide manufacture, particularly the sintering operation, are highly desirable. Significant reductions in the time or the temperature necessary to effect desired changes during sintering can substantially influence the economic attractiveness of any alterations in the manufacturing process.

It is an object of this invention to provide improvements in the process of preparing ceramic oxide compositions.

It is another object of this invention to prepare ceramic oxide compositions at lower sintering temperatures than employed heretofore.

It is a further object of this invention to prepare ceramic oxide compositions from structurally diphasic xerogels.

SUMMARY OF THE INVENTION

In accordance with the invention, there is provided a process for preparing ceramic oxide compositions which involves the formation of two structurally dissimilar ceramic oxide sols which are converted to an inhomogeneous gel, dried to a structurally diphasic xerogel and then thermally treated, i.e., sintered, to provide a crystalline ceramic oxide.

In particular, this invention relates to a process of preparing a ceramic oxide which comprises:

(a) combining a first ceramic oxide sol or a precursor for said first ceramic oxide sol with a second ceramic oxide sol to form an inhomogeneous sol, said second ceramic oxide being crystalline, said first ceramic oxide being structurally dissimilar to said second ceramic oxide, said first ceramic oxide sol comprising a major portion and said second ceramic oxide sol comprising a minor portion of said inhomogeneous sol and said first sol and said second sol being effective to form an inhomogeneous sol;

(b) converting said inhomogeneous sol to an inhomogeneous gel;

(c) drying said gel under conditions effective to provide a structurally diphasic xerogel; and (d) sintering said structurally diphasic xerogel under conditions effective to provide a single phase crystalline ceramic oxide.

DESCRIPTION OF THE PREFERRED EMBODIMENTS

FIGS. 1A, 1B, 1C and 1D are microphotographs showing the microstructure (polished surface) of several boehmite gels sintered at 1200° C.

DESCRIPTION OF THE PREFERRED EMBODIMENTS

Figure 2:
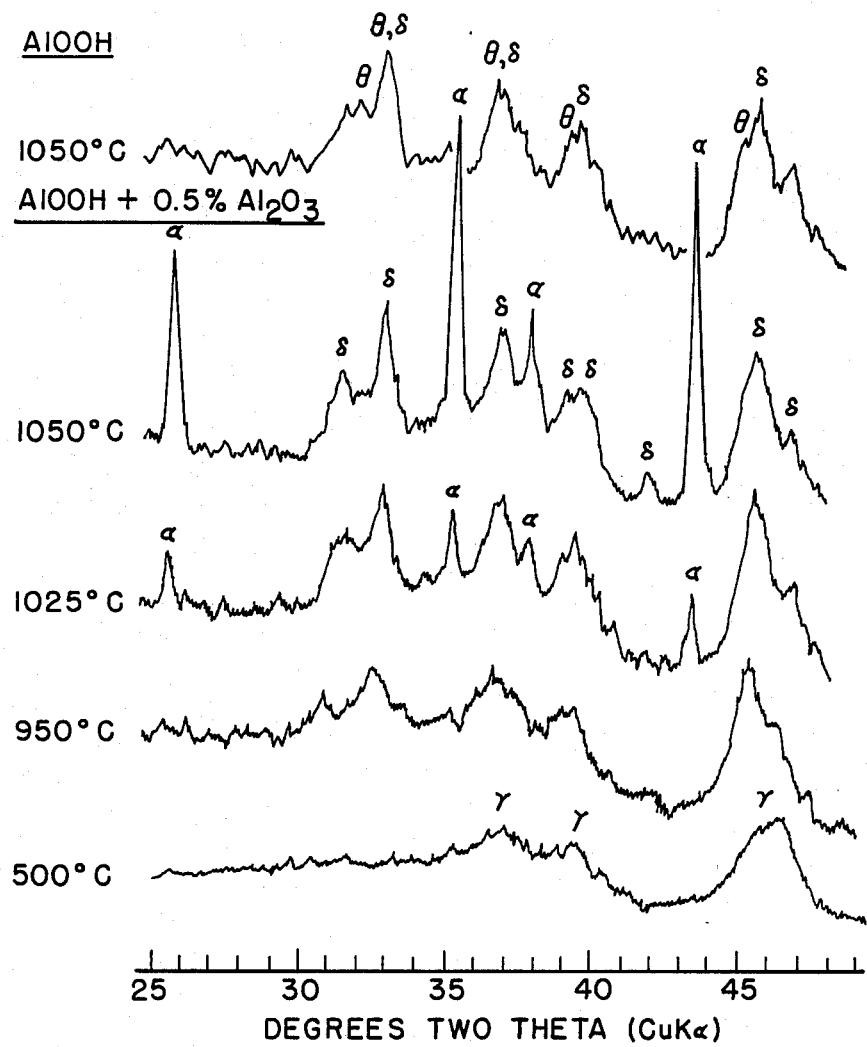
FIG. 2 is an x-ray diffraction pattern of several boehmite gels heated at various temperatures.

Ceramic oxides are prepared by sintering to convert the raw materials to hard crystalline products. During sintering, the ceramic oxide may pass through several crystalline forms before it reaches the most stable form, or a compound may be formed from its component oxides. By the practice of the present invention, it is possible to prepare ceramic oxide compositions having enhanced densification at lower sintering temperatures than employed heretofore. Briefly, the subject invention includes the preparation of structurally dissimilar but chemically similar sols which are combined to prepare an inhomogeneous sol which is then gelled and dried to provide a structurally diphasic xerogel. By subjecting this structurally diphasic xerogel to sintering temperatures lower than normally required, a ceramic composition having a single crystalline structure and enhanced densification may be prepared. An example of this procedure involves the preparation of a diphasic xerogel of crystalline alumina and noncrystalline alumina. Upon effective sintering, a corundum product having enhanced densification is provided.

This improved technique may be described as the seeding of a solid-state reaction since the seeds are in the crystalline form of the final product and the noncrystalline or amorphous portion of the diphasic gel is converted to the final crystalline product.

The structurally diphasic xerogels employed in the practice of this invention may be prepared in accordance with the disclosures of the commonly assigned applications of which this is a continuation-in-part. This application is a continuation-in-part of U.S. application Ser. No. 893,120 filed Aug. 1, 1986, which is a continuation-in-part of application Ser. No. 546,856, filed Oct. 31, 1983, both of which are incorporated herein by reference.

These commonly assigned copending applications describe the preparation of diphasic xerogels but do not disclose the lower sintering temperatures and enhanced densification achieved by the practice of the present invention.

The parent and grandparent applications of this application describe a number of methods for preparing diphasic xerogels. In one method, all components are mixed in a single solution to form an inhomogeneous sol and then a gel, which is dried to provide the diphasic xerogel.

The second method disclosed involves the initial preparation of a single component oxide sol to which is added a solution containing the dissolved components to provide an inhomogeneous sol which is again converted to a diphasic gel and then dried to provide the diphasic xerogel.

In the third preparation technique, and the one which is particularly preferred in practicing the present invention, two sols are provided (either of which may be prepared from a liquid solution precursor). The two sols are combined to form the diphasic sol which is converted to a diphasic gel and then dried to the diphasic xerogel. For the purposes of the present invention, one of the sols contains an amorphous, a noncrystalline, or a semi-crystalline ceramic oxide, while the other contains the same chemical component but in crystalline form which is an altogether different structure than the former. Therefore, when this structurally diphasic xerogel is subjected to sintering temperatures, the noncrystalline or amorphous phase apparently crystallizes epitaxially onto the crystalline nuclei at a lower temperature than is otherwise possible.

This preferred third method involves the use of two ceramic oxide sols or a ceramic oxide sol and a sol of a precursor of a ceramic oxide. The individual oxide sols may be prepared or obtained commercially and employed in preparing the structurally diphasic xerogels. It is also possible to prepare a sol in situ from a ceramic oxide precursor. The materials, e.g., ceramic oxide sol or ceramic oxide sol precursor, are selected so that when they are mixed and, in the case of the precursor, converted to a ceramic oxide sol, they form an inhomogeneous sol. Further, when this technique is employed to practice the present invention, one of the ceramic oxides should be in the crystalline form, while the other is structurally dissimilar in that it is either amorphous, noncrystalline, or semicrystalline. Once the inhomogeneous sol is formed, it is converted to an inhomogeneous gel by the removal of water. Following this, the diphasic gel is dried to provide the diphasic xerogel.

The sols which may be usefully employed in forming the inhomogeneous sols and gels required in this invention include sols of high temperature ceramic such as $Al_2O_3$, $SiO_2$, $TiO_2$, $ZrO_2$, $MgO$ or ceramic compounds such as ferroelectric perovskites ($BaTiO_3$, $PbTiO_3$, $(Pb,Zr)TiO_3$ and related structures), or ceramic magnetic spinels, garnets and the like. The sols may be premade or may be made in situ from solutions. Further, the sols are crystalline, amorphous or noncrystalline. As mentioned below, they are similar in composition but differ in structure so that when one sol is, for example, crystalline quartz, the other may be of noncrystalline $SiO_2$, or where one is crystalline corundum, the other is hydrated alumina. The following is a table of some examples of the amorphous or noncrystalline phases and crystalline phases which may be employed in the practice of this invention:

| Amorphous, Noncrystalline or Semi-crystalline Phase | Crystalline Phase |
| --- | --- |
| AlOOH (Boehmite) | —$Al_2O_3$ |
| $\alpha Al_2O_3$ MgO | —$Al_2O_3$ |
| $\alpha Al_2O_3$ MgO | $MgAl_2O_4$ |
| $TiO_2$ (Amorphous) | $TiO_2$ (Rutile) |

Once the compositions are chosen, the optimum way for mixing the sols can be selected. In the simplest case, the desired sols may be commercially available and may be simply mixed together. Ultimately, one phase may be present as a sol such as a sol of boehmite, while the other may be formed after mixing the sol with a solution such as magnesium nitrate. Alternatively, the boehmite sol can be prepared from boehmite powder by dispersing it in water and subsequently adding 1N $HNO_3$ dropwise while stirring. Sols of zirconia or titania can be made from a saturated solution of zirconyl nitrate or titanium oxychloride solution by hydrothermally heating in Parr bombs at about 100° C. for two days.

The general procedure of preparing the diphasic xerogels for use in this invention involves mixing together two structurally dissimilar but chemically similar sols. This diphasic sol is permitted to gel by letting the sol mixture stand at a temperature of about 25°–75° C. Gelation may take place in either an open or closed system. In an open system, water is evaporated from the diphasic sol as the diphasic gel is formed. In a closed system, there is no shrinkage in volume. As the diphasic gel forms, the mechanical properties change slowly from those of a diphasic liquid to those of a diphasic solvent. The choice of an open or closed system will depend upon the composition of the system involved, and one having ordinary skill in the art can select the appropriate system without an undue amount of experimentation. After the gel formation is completed, the diphasic gel is dried, preferably under non-reducing conditions, to provide the structurally diphasic xerogel.

The conversion of the diphasic sol to the diphasic gel and the subsequent conversion of the diphasic gel to the diphasic xerogel is described in grandparent application Ser. No. 546,856. This description may be summarized as follows: The conversion from the sol to the gel occurs at room temperature to 70° C. in either an open system requiring several minutes to several hours or a closed system requiring from one-half hour to several days. The drying of the gel to provide the xerogel may be conducted at ambient temperatures requiring several hours to two to three days, in an oven at temperatures of about 110° to about 125° C. for about 30 minutes, in a microwave oven for several minutes or in a reducing furnace at about 200° to about 700° C. for about 10 minutes. These procedures are illustrated in the examples of the grandparent application. The sols were converted to gels at room temperature in an open system, by partial drying near room temperature, at 30° to 50° C. in an open system, at room temperature in an open system, and standing at room temperature for two days. Drying the gels to form the xerogel is exemplified in the grandparent application by drying at temperatures from 350° to 700° C. in forming gas of 95% $N_2$, 5% $H_2$ and by reducing at temperatures from 200° to 400° C. in forming gas.

The practice of the present invention to provide ceramic oxide compositions having enhanced densification but prepared at lower sintering temperatures requires the preparation of a diphasic xerogel having a crystalline phase and a noncrystalline or amorphous phase. The sintering technique involved here, which may be described as solid-state seeding or the seeding of solid-state reactions, causes the amorphous, noncrystalline, or semi-crystalline phase of the structurally diphasic gel to crystallize epitaxially onto the crystalline nuclei at a lower temperature than is otherwise possible, while at the same time causing an enhanced densification of the final crystalline ceramic product.

The structurally diphasic gel employed in the practice of the present invention consists of a major portion of the amorphous or noncrystalline ceramic oxide and only a minor portion of the crystalline phase. It has been found that the crystalline or seed portion of the xerogel need only constitute a small portion of the xerogel. The crystalline phase may be less than 5 wt. % as little as 0.02 to 2 wt. %, preferably 0.05 to 0.5 wt. %, of the structurally diphasic xerogel. Larger quantities of the crystalline material may, of course, be used, but there is no advantage in doing so, particularly, if the raw materials for the noncrystalline or amorphous phase are less expensive than the crystalline portion.

These sintering temperatures for the various ceramic oxides are well-known. For example, the sintering temperature to convert lower forms of alumina to corundum is about 1150° C. The transition temperatures for the other ceramic oxides are equally well-known. Thus, those skilled in the art can utilize conventional technology in converting the structurally diphasic xerogels of this invention to the densified ceramic products of this invention but at somewhat lower sintering temperatures than have been required heretofore.

The diphasic xerogels employed herein may be termed nanoscale compositions since they are two-phased products with the physical dimensions of the phases lying in the range of 1 nm to 20 nm. The two phases may differ in either composition or structure or both although for use in the present invention, of course, the phases are compositionally the same but structurally dissimilar. Thus, it is possible to prepare nanocomposites of 10 nm rutile crstals and 100 nm non-crystalline $TiO_2$ or 10 nm AlOOH and 20 nm $\alpha$-$Al_2O_3$. Converting structurally diphasic xerogels, which are themselves nanocomposites, in accordance with the practice of the present invention provides ceramics with a fine nanostructure.

The practice of the present invention is illustrated by the following examples.

EXAMPLE 1

Preparation of Xerogels in the $Al_2O_3$ System

All the diphasic xerogels of the $Al_2O_3$ system were made using boehmite (Dispural, Remet Chemical Corp., Chadwicks, N.Y.) as one gel with different seeds such as $\alpha$-$Al_2O_3$ (A-16 SG, Aluminum Co. of America, Inc., Pittsburgh, Pa.), spinel, $MgAl_2O_4$ (Baikalox SG, Baikowski International Corp., Charlotte, N.C.), quartz (Alfa Products, Danvers, Mass.), $Cr_2O_3$ (J. T. Baker Chemical Co., Phillipsburg, N.J.), and $\alpha$-$Fe_2O_3$. The latter were synthesized by the method of Matijevic (22).

In each case boehmite ($\approx$70 Å particle size) was initially dispersed in water and peptized by the dropwise addition of 1N $HNO_3$ with constant stirring until a clear hydrosol was obtained. The seed crystals, $\alpha$-$Al_2O_3$ (~0.2 to 0.4 $\mu$m), spinel (~0.05 to 0.1 $\mu$m), quartz (~0.5 $\mu$m), $Cr_2O_3$) (~0.5 $\mu$m) and $\alpha$-$Fe_2O_3$ (~ —0.5 $\mu$m) were peptized with 1N $HNO_3$ to form a sol prior to their addition to boehmite hydrosol. The two sols were mixed thoroughly and the diphasic sol gelled in 0.5 to 8 hours. The weight ratios of boehmite to water varied between 20/80 to 15/85. The mole ratios of $HNO_3$ to boehmite ranged between 0.05 to 0.07. In each series, gels and thence xerogels were prepared with varying concentrations of seeds; e.g., $\alpha$-$Al_2O_3$ (0 to 2.7%) and spinel (0 to 7.3%).

Preparation of Xerogels in $Al_2O_3$-MgO System

Diphasic xerogels of different compositions in the $Al_2O_3$-MgO system were prepared from boehmite (Dispural) and $Mg(NO_3)_2.6H_2O$. The $Mg(NO_3)_2$ solution was added dropwise to clear boehmite hydrosol, which was prepared by initially dispersing boehmite in water and subsequently adding 1N $HNO_3$ dropwise while stirring. The seed crystals, $\alpha$-$Al_2O_3$ (particle size =0.2~0.4 um) and spinel (~0.05 to 0.1 $\mu$m), were peptized by $HNO_3$ to form a sol and added to the boehmite hydrosol prior to the addition of $Mg(NO_3)_2$ solution. The boehmite hydrosol rapidly flocculated and gelled upon the addition of $Mg(NO_3)_2$ solution. The gels were dried at room temperature for 10 days prior to characterization by different methods. The amount of water as well as the concentration of $HNO_3$ were critical for obtaining homogeneous gels. For gels of 95.8% $Al_2O_3$-4.2% MgO wt. ratio (or 90/10 mole ratio) which corresponds to the eutectic composition, 12/88 ratio of boehmite to water by weight was used. A mole ratio of 0.07 $HNO_3$ to boehmite was found to give the best results. Sols of $\alpha$-$Fe_2O_3$ and quartz were used as seeds in addition to $\alpha$-$Al_2O_3$ and spinel ($MgAl_2O_4$) The effect of varying concentrations of $\alpha$-$Al_2O_3$ (0.045 to 0.9 wt. %) and spinel seeds (0.09 to 1.16 wt. %) on the two gel compositions was also investigated.

Characterization of Materials

The gel tablets or pieces were sintered by stepwise heating in air using a programmed furnace. The heating rates were 1° C./min. up to 200° C. (heated for 1 hr. at this temperature), 1.5° C./min. between 200°–500° C., 3° C./min. between 500°–800° C. The samples were heated for 100 min. at the final sintering temperature. Microstructures of the sintered and annealed materials were determined by scanning electron microscopy using an ISI DS-130 instrument. The morphology and particle size of the size of the seed crystals were determined by transmission electron microscopy using Philips EM 300 and 420 instruments. X-ray powder diffraction was carried out on samples heated to various temperatures with a Philips diffractometer using Ni-fitered CuKa radiation. Densities of the sintered materials after evacuation were measured by the Archimedes technique. These densities are apparent densities as opposed to bulk densities because the open pores were evacuated prior to the density measurements.

Results and Discussion

Densification of Boehmite Gels by Seeding

The effects of varying concentrations of different seeds such as $\alpha$-$Al_2O_3$, spinel ($MgAl_2O_4$), $Cr_2O_3$, $Fe_2O_3$, keolinite [$Al_2Si_2O_5(OH)_4$] and ludox (amorphous $SiO_2$ sol) on densification of boehmite gels are presented in Table 1 below. The densification and sintering behavior were measured by the apparent densities of the sintered materials. These apparent densities were measured by eliminating the open pores by evacuation and are, therefore, different from their bulk densities. The unseeded boehmite gels sintered to 98% of their theoretical density whereas both the $\alpha$-alumina and spinel seeded (0.5%) gels sintered to 99.6% of their theoretical density at 1200° C. (Table 1). The $Cr_2O_3$ and $Fe_2O_3$ (both isostructural with corundum) seeded gels as well as the gels seeded with kaolinite and ludox resulted in lower densities. All the densities reported here are high because of the elimination of open pores during the measurement.

The effect of seeding of solid state reactions on densification is clearly seen from the microstructural studies. Microstructures of the unseeded gels show non-uniform grain growth and open porosity (FIG. 1A). Although the grain growth appears to be uniform (0.1–0.2 $\mu$m) in the spinel and $Fe_2O_3$ seeded gels, they show considerable porosity ( FIGS. 1B and 1C). The $\alpha$-$Al_2O_3$ seeded gels, on the other hand, show uniform grain growth with little porosity (FIG. 1D). The above results with different seeds clearly show that $\alpha$-$Al_2O_3$ seeds are the most effective for enhanced densification and sintering with little or no porosity. The mechanism of enhanced densification of $\alpha$-$Al_2O_3$ seeded boehmite gels appears to be epitaxial growth on isostructural seed crystals. That solid-stage epitaxy and not colloidal phenomenon appears to be the mechanism for enhanced densification and sintering is based on these studies on gels with different seeds. Even through $\alpha$-Fe$_2$O$_3$ and Cr$_2$O$_3$ are isostructural with $\alpha$-Al$_2$O$_3$, they were not as effective as the $\alpha$-Al$_2$O$_3$ because of about 5.5% lattice mismatch. Thus, it appears to be important to exactly match the lattices.

cation. That colloidal effects are not the cause of enhanced densification is shown by the lack of effect on the ludox seeded gels (Table 2). The apparent densities measured here do not take the open porosity into consideration, and that is why the densities achieved are quite high even for unseeded gels. The bulk densities of

TABLE 1

Apparent Densities (g/cm$^3$) of Unseeded and Seeded Boehmite Gels Sintered (100 min.) to Different Temperatures (°C.).

| Seed, wt % | | 800° C. | 1000° C. | 1200° C. | 1300° C. | 1450° C. |
|---|---|---|---|---|---|---|
| No seed | | 3.29 (82.5)* | 3.30 (82.8) | 3.91 (98.0) | 3.912 (98.1) | 3.90 (98.0) |
| $\alpha$-Al$_2$O$_3$ | 0.08 | | | 3.94 (98.8) | 3.94 (98.8) | 3.96 (99.3) |
| | 0.16 | | | 3.95 (99.1) | 3.93 (98.6) | 3.96 (99.3) |
| | 0.40 | | | 3.97 (99.6) | 3.94 (98.8) | 3.94 (98.8) |
| | 0.5 | 3.27 (82.0) | 3.37 (84.5) | 3.97 (99.6) | | |
| | 0.8 | | | 3.97 (99.6) | 3.97 (99.6) | |
| | 2.7 | | | 3.94 (98.8) | 3.81 (95.6) | |
| Spinel | 0.1 | | | 3.94 (98.8) | 3.74 (93.8) | 3.89 (97.6) |
| | 0.2 | | | 3.97 (99.6) | 3.95 (99.1) | 3.96 (99.3) |
| | 0.5 | 3.27 (82.0) | 3.34 (83.8) | 3.97 (99.6) | | |
| | 1.0 | | | 3.95 (99.1) | 3.95 (99.1) | |
| | 7.3 | | | 3.91 (98.0) | 3.91 (98.0) | |
| Cr$_2$O$_3$ | 0.5 | 3.23 (81.0) | 3.39 (85.0) | 3.49 (87.5) | 3.92 (98.3) | |
| Ludox | 0.15 | 3.23 (81.0) | 3.30 (82.8) | 3.47 (87.0) | 3.88 (97.3) | |
| | 0.35 | | | 3.50 (87.8) | 3.91 (98.1) | |
| Hematite | 0.5 | 3.25 (81.5) | 3.33 (83.5) | 3.75 (94.1) | 3.95 (99.1) | |
| | 1.0 | | | 3.96 (99.3) | 3.97 (99.6) | |
| Kaolinite | 0.5 | 3.34 (83.8) | 3.34 (83.8) | 3.84 (96.3) | 3.93 (98.6) | |

*Numbers in parentheses are densities relative to theoretical density of 3.986 for $\alpha$-Al$_2$O$_3$.

X-ray diffraction analyses of isothermally heated boehmite gels, both seeded and unseeded show that $\alpha$-Al$_2$O$_3$ crystallization was enhanced in seeded gels at 1050° C. while unseeded gels transformed to $\delta$Al$_2$O$_3$ and $\theta$Al$_2$O$_3$ but not to $\alpha$-Al$_2$O$_3$ (FIG. 2). These results clearly show the effect of 0.5% $\alpha$-Al$_2$O$_3$ seeds in lowering the crystallization temperature of $\alpha$-Al$_2$O$_3$ from boehmite.

Figure 3A:
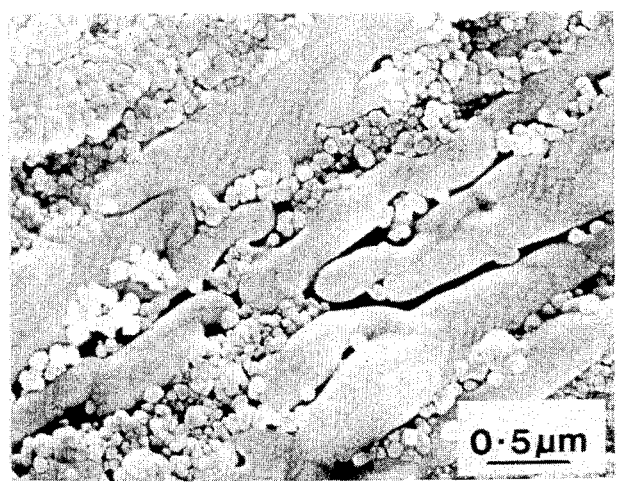
FIGS. 3A, 3B and 3C are microphotographs showing the microstructural (fractured surfaces) of several $Al_2O_3$-MgO gels sintered at 1300° C.
Figure 3B:
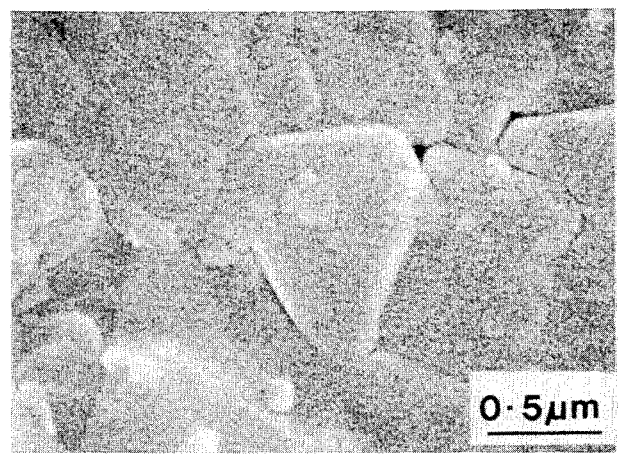
Figure 3C:
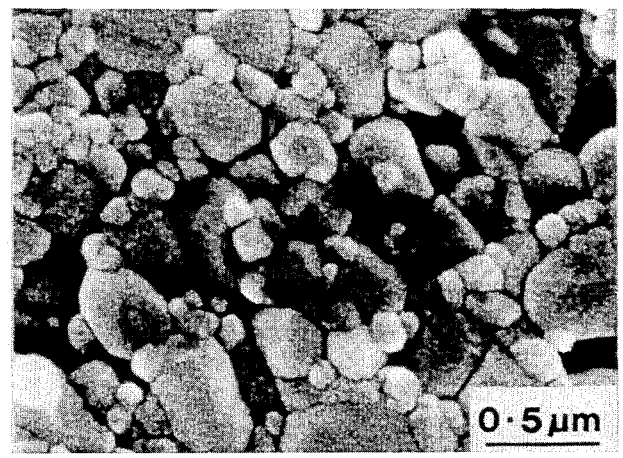

Densification of Two Component Gels by Seeding: The System Al$_2$O$_3$-MgO unseeded gels will be lower, however. Microstructural characterization of the sintered gels bears this out. Fractured surfaces of unseeded gels, as presented in FIG. 3A, show much porosity and non-uniform grain growth. Spinel seeding resulted in uniform grain growth (FIG. 3B) and shows grains on the order of 1 $\mu$m. The $\alpha$-alumina seeded gels showed dense microstructure with submicrometer grains (FIG. 3C). These results show that isostructural seeding results in enhanced densification and sintering by solid-state epitaxy.

TABLE 2

Apparent Densities (g/cm$^3$) of Unseeded and Seeded Gels of 93% Al$_2$O$_3$—7% MgO Sintered (100 min.) to Different Temperatures (°C.).

| Seed, wt % | | 800° C. | 1000° C. | 1200° C. | 1300° C. | 1450° C. |
|---|---|---|---|---|---|---|
| No seed | | 3.25 (83.8)* | 3.35 (86.4) | 3.44 (88.7) | 3.62 (93.4) | 3.63 (93.6) |
| $\alpha$-Al$_2$O$_3$ | 0.07 | | | 3.44 (88.7) | 3.44 (88.7) | 3.72 (95.9) |
| | 0.14 | | | | 3.54 (91.3) | 3.81 (98.3) |
| | 0.1 | | | 3.81 (98.3) | 3.81 (98.3) | |
| | 0.2 | | | 3.86 (99.6) | | |
| | 0.5 | 3.21 (82.8) | 3.53 (91.0) | 3.78 (97.5) | 3.71 (95.7) | |
| | 1.0 | | | 3.75 (96.7) | 3.77 (97.2) | |
| | 2.0 | | | 3.76 (96.9) | 3.83 (98.8) | |
| Spinel | 0.09 | | | | 3.70 (95.4) | 3.43 (88.4) |
| | 0.18 | | | 3.70 (95.4) | 3.66 (94.4) | |
| | 0.46 | | | 3.72 (95.9) | 3.68 (94.9) | |
| | 0.20 | | | 3.74 (96.5) | 3.70 (95.4) | |
| | 0.50 | 3.26 (84.1) | 3.36 (86.7) | 3.78 (97.5) | 3.77 (97.2) | |
| Ludox | 0.5 | 3.26 (84.1) | 3.33 (85.9) | 3.55 (91.6) | 3.77 (97.2) | |
| Hematite | 0.24 | | | 3.71 (95.7) | 3.66 (95.4) | |
| | 0.50 | | | 3.71 (95.7) | 3.76 (97.0) | |

*Numbers in parentheses are densities relative to theoretical density of 3.877 for 93% Al$_2$O$_3$—7% MgO composition.

Figure 4:
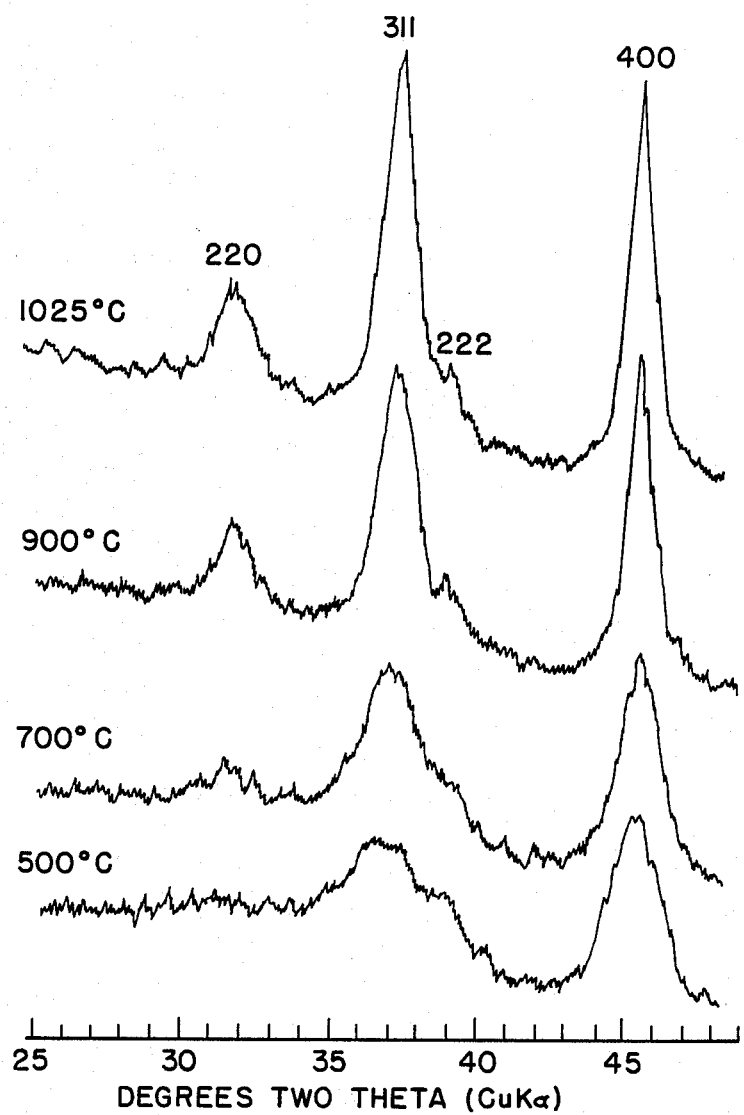
FIGS. 4-7 are x-ray diffraction patterns of several $Al_2O_3$-MgO gels heated to various temperatures.
Figure 5:
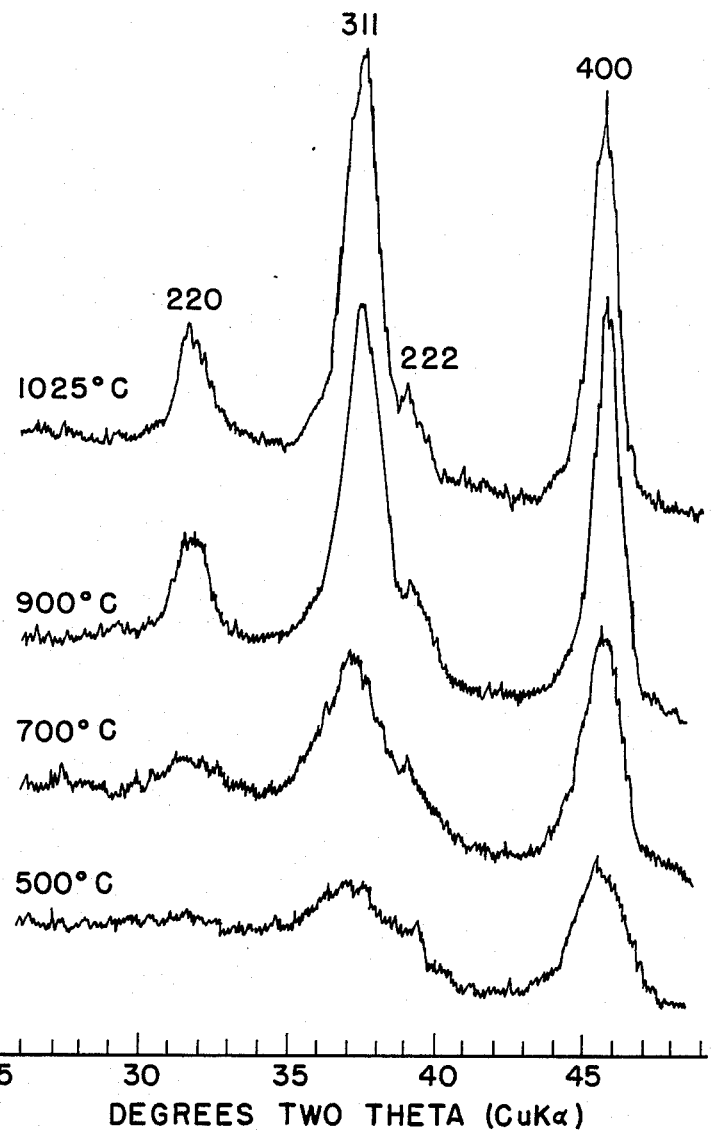
Figure 6:
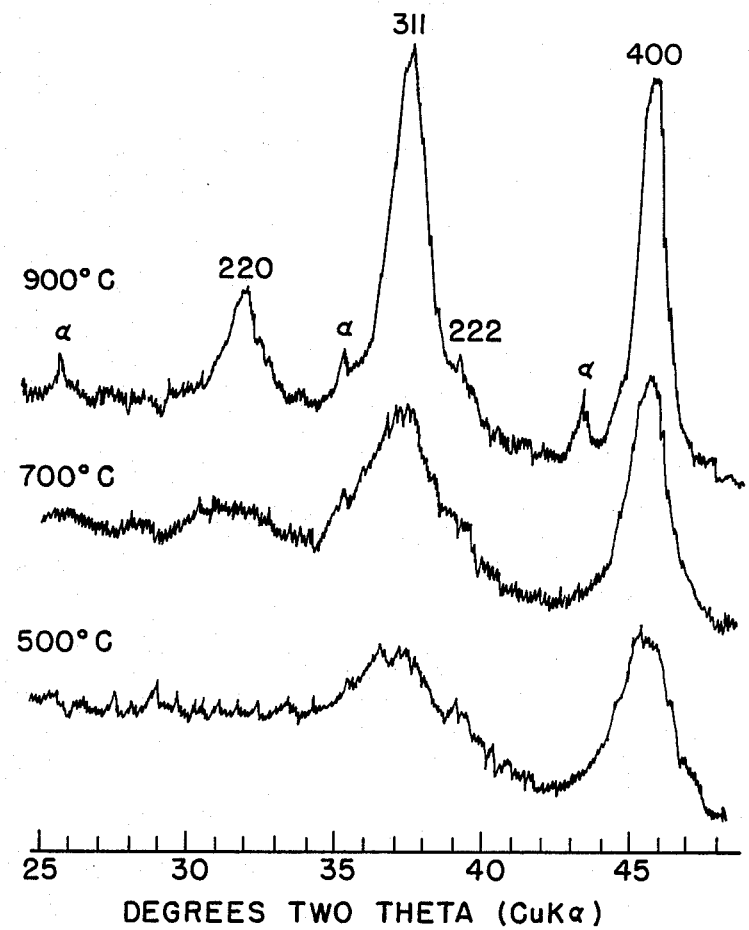
Figure 7:
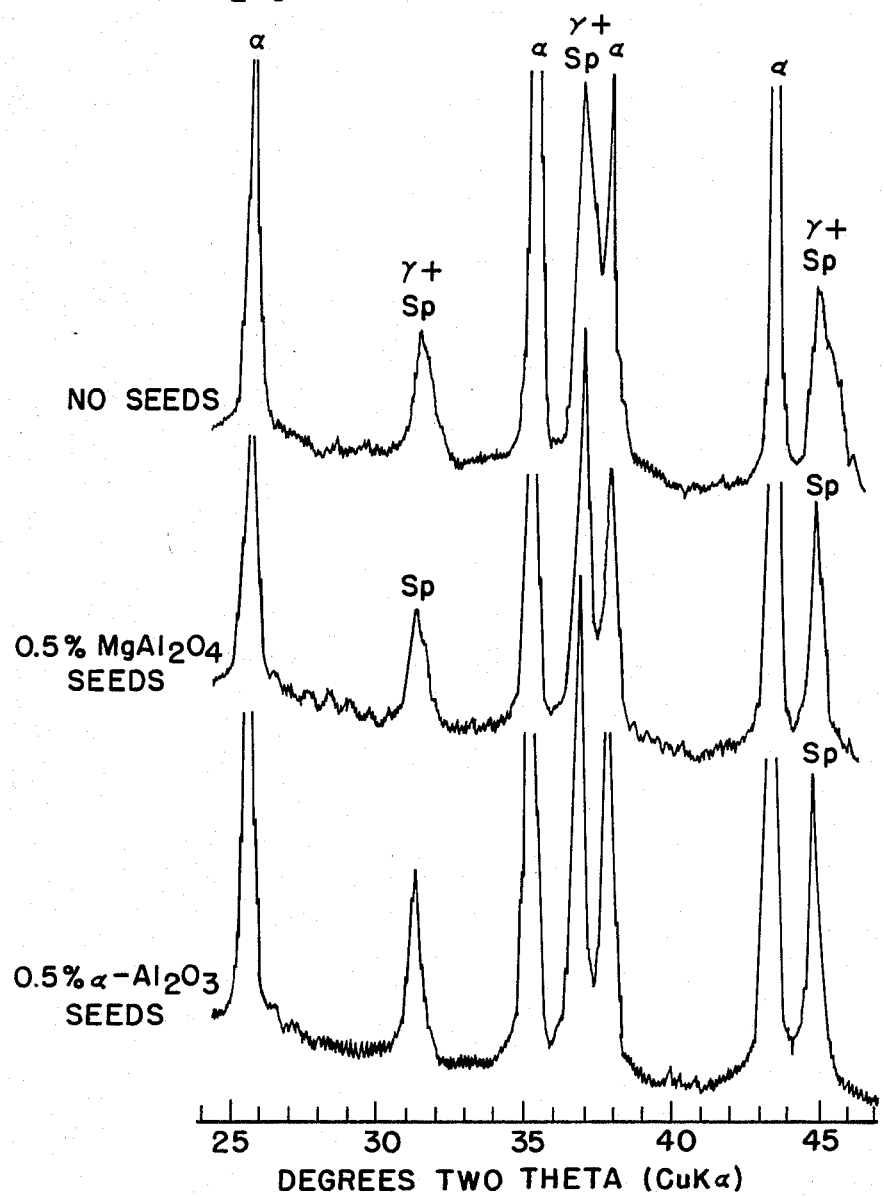

93/7=Al$_2$O$_3$-MgO Gels. The effects of varying concentrations of different seeds on the Al$_2$O$_3$-MgO gels are presented in Table 2, below. These gels seeded with $\alpha$-alumina and spinel show higher densities than the unseeded and ludox seeded gels. Seeding with hematite which is isostructural with $\alpha$-alumina appears to enhance densification as well. The results with $\alpha$-alumina and spinel which are isostructural with the equilibrium phase assemblage of the sintered samples suggests that solid-state epitaxy may be the cause of enhanced densifi- X-ray diffraction analyses of the unseeded and spinel seeded gels show that the $\gamma$Al$_2$O$_3$-MgAl$_2$O$_4$ solid solution phase was stabilized by the presence of MgO in this system (FIGS. 4 and 5) unlike the Al$_2$O$_3$ system where the $\theta$ (clearly detected at higher angles) and polymorphs formed (FIG. 2). The $\alpha$-Al$_2$O$_3$-MgAl$_2$O$_4$ solid solution was identified by lattice parameter (a$_o$) calculations from the 400 and 440 hkl reflections. These lattice parameter results are presented in Table 3, below. The solid sllution showed $a_o$ parameter intermediate to those of $MgAl_2O_4$ and $\gamma$-$Al_2O_3$ (Table 3). The crystallization of 93/7 gels with $\alpha$-$Al_2O_3$ seeds as a function of temperature is shown in FIG. 6. The $\alpha$-$Al_2O_3$ seeded gels showed enhanced crystallization of $\alpha$-Al 0 at 900° C. (FIG. 6) but not the unseeded or spinel seeded gels (FIGS. 4 and 5). Both $\alpha$-$Al_2O_3$- and spinel-seeded gels were effective in the complete transformation of $\gamma$-$Al_2O_3$-$MgAl_2O_4$ solid solution to $\alpha$-$Al_2O_3$ and spinel (FIG. 7) at 1100° C. The unseeded gels, however, did not completely transform to $\alpha$-$Al_2O_3$ and spinel and show $\gamma$-$Al_2O_3$ as a shoulder of the spinel peak (FIG. 7).

95.2/4.8=$Al_2O_3$-MgO Gels. These gels seeded with $\alpha$-alumina and spinel show enhanced densification as measured by densities compared to the unseeded gels. These results are presented in Table 4, below. Here also solid-stage epitaxy appears to be the mechanism of enhanced densification as discussed above.

the thermodynamics of the xerogel->ceramics transformation was obtained by DTA, using the Harrop (Model TA700) and Perkin-Elmer (Model DTA1700) instruments. X-ray and SEM characterization were performed on most samples at various stages of the heating cycle. Optical microscopy was employed to evaluate the extraordinarily large corundum crystals obtained under certain conditions. Further details on the experimental conditions are included in the following discussion of the results.

1. Solid-State Epitaxial Effects in One-Component Diphasic Systems 1.1 The System $TiO_2$ A noncrystalline $TiO_2$ sol was made by hydrolyzing titanium ethoxide. This procedure involved addition of 1 mole of water and 1.5 ml. of concentrated nitric acid to 900 ml. ethanol and mixing, followed by the addition of 0.5 mole of titanium ethoxide and mixing. The $TiO_2$

TABLE 3

Identification of Phases by XRD in $Al_2O_3$—MgO Xerogels After Heat Treatment.

| Sample | Heat treatment (°C.) | Lattice parameter of spinel phase $a_o$(Å) | Phases identified by XRD |
|---|---|---|---|
| $MgAl_2O_4$ (PDF 21-1152) | none | 8.083 | Spinel ($MgAl_2O_4$) |
| Commercial $\gamma$-$Al_2O_3$ | none | 7.908 | $\gamma$-$Al_2O_3$ |
| Boehmite (Dispural) | 500 | 7.892 | $\gamma$-$Al_2O_3$ |
| $Al_2O_3$/MgO = 93/7, no seeds | 500 | 7.976 | $\gamma$-$Al_2O_3$—$MgAl_2O_4$ SS* |
| $Al_2O_3$/MgO = 93/7, no seeds | 700 | 7.974 | $\gamma$-$Al_2O_3$—$MgAl_2O_4$ SS* |
| $Al_2O_3$/MgO = 93/7, no seeds | 1025 | 7.974 | $\gamma$-$Al_2O_3$—$MgAl_2O_4$ SS* |
| $Al_2O_3$/MgO = 93/7, no seeds | 1100 | ~8.04 to 8.08 | $\alpha$-$Al_2O_3$ and $\gamma$-$Al_2O_3$—$MgAl_2O_4$ phase separation |
| $Al_2O_3$/MgO = 93/7 + 0.5% $\alpha$-$Al_2O_3$ seeds | 500 | 7.974 | $\gamma$-$Al_2O_3$—$MgAl_2O_4$ SS |
| $Al_2O_3$/MgO = 93/7 + 0.5% $\alpha$-$Al_2O_3$ seeds | 700 | 7.974 | $\gamma$-$Al_2O_3$—$MgAl_2O_4$ SS |
| $Al_2O_3$/MgO = 93/7 + 0.5% $\alpha$-$Al_2O_3$ seeds | 900 | 7.974 | $\gamma$-$Al_2O_3$—$MgAl_2O_4$ SS + tr.$\alpha$-$Al_2O_3$ |
| $Al_2O_3$/MgO = 93/7 + 0.5% $\alpha$-$Al_2O_3$ seeds | 1025 | 7.980 | $\gamma$-$Al_2O_3$—$MgAl_2O_4$ SS + $\alpha$-$Al_2O_3$ |
| $Al_2O_3$/MgO = 93/7 + 0.5% $\alpha$-$Al_2O_3$ seeds | 1100 | 8.083 | $\alpha$-$Al_2O_3$ + $MgAl_2O_4$ |
| $Al_2O_3$/MgO = 93/7 + 0.5% $MgAl_2O_4$ seeds | 500 | 7.974 | $\gamma$-$Al_2O_3$—$MgAl_2O_4$ SS |
| $Al_2O_3$/MgO = 93/7 + 0.5% $MgAl_2O_4$ seeds | 700 | 7.974 | $\gamma$-$Al_2O_3$—$MgAl_2O_4$ SS |
| $Al_2O_3$/MgO = 93/7 + 0.5% $MgAl_2O_4$ seeds | 900 | 7.974 | $\gamma$-$Al_2O_3$—$MgAl_2O_4$ SS |
| $Al_2O_3$/MgO = 93/7 + 0.5% $MgAl_2O_4$ seeds | 1025 | 7.974 | $\gamma$-$Al_2O_3$—$MgAl_2O_4$ SS |
| $Al_2O_3$/MgO = 93/7 + 0.5% $MgAl_2O_4$ seeds | 1100 | 8.083 | $\alpha$-$Al_2O_3$ + $MgAl_2O_4$ |

*SS = solid solution,
tr = trace

TABLE 4

Apparent Densities (g/cm$^3$) of Unseeded and Seeded Gels of 95.8% $Al_2O_3$—4.2% MgO Sintered (100 min.) to Different Temperatures (°C.)

| Seed, wt % | | 1000° C. | 1200° C. | 1300° C. | 1400° C. |
|---|---|---|---|---|---|
| No seed | | 3.36 (85.7)* | 3.38 (86.2) | 3.34 (85.2) | 3.45 (88.0) |
| $\alpha$-$Al_2O_3$ | 0.09 | | 3.82 (97.4) | 3.47 (88.5) | |
| | 0.18 | | 3.85 (98.2) | 3.51 (89.5) | |
| | 0.45 | 3.42 (87.2) | 3.82 (97.4) | 3.59 (91.6) | |
| | 0.90 | | 3.63 (92.6) | 3.67 (93.6) | |
| Spinel | 0.12 | | 3.30 (84.2) | 3.61 (92.1) | |
| | 0.23 | | 3.75 (95.7) | 3.48 (88.8) | |
| | 0.58 | 3.36 (85.7) | 3.71 (94.6) | 3.50 (89.3) | |
| | 1.16 | | 3.63 (92.6) | 3.57 (91.1) | |

*Numbers in parentheses are densities relative to theoretical density of 3.920 for 95.8% $Al_2O_3$—4.2% MgO composition.

EXAMPLE 2

Diphasic xerogels were prepared by thoroughly mixing two pre-existing sols at low viscosities so that "perfect mixing" was obtained. Gels were then formed from the mixed sol which was then dried to an anhydrous (xerogel) condition. These various xerogels were used for characterization and other reaction studies. Data on was determined to be noncrystalline by X-ray diffraction and electron diffraction.

Figure 8:
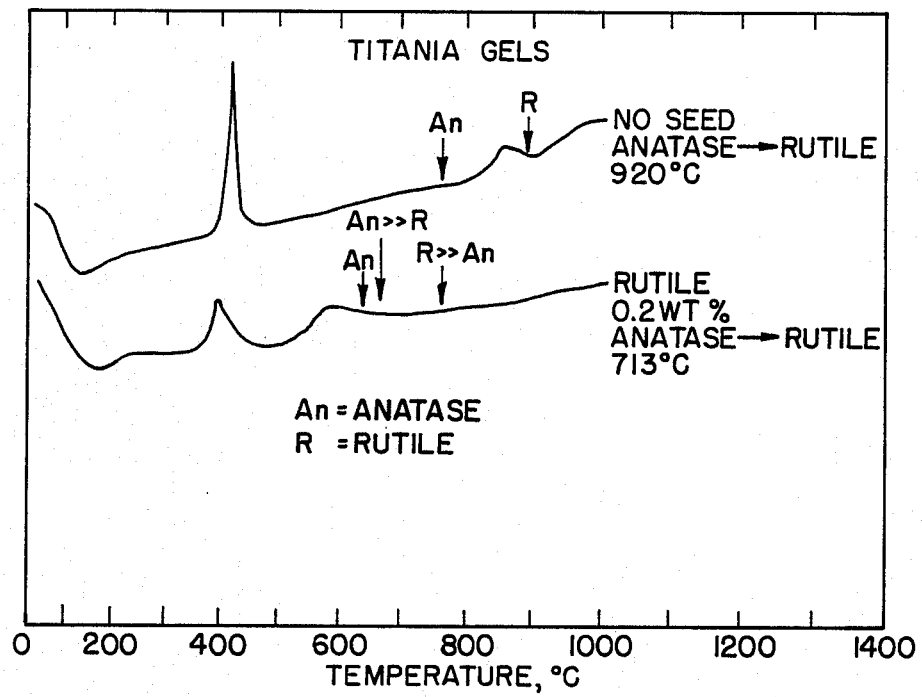
FIG. 8 is a DTA heating curve of titania diphasic xerogels.

By adding a rutile-sol to the noncrystalline $TiO_2$ sol and mixing thoroughly prior to gelation of titania, a series of diphasic gels was prepared where the total solid phases contained 0.2, 0.5, ... 5% by weight of 0.1 um rutile crystals. The unseeded and seeded gels were dried at 400° C. to remove most of the organics prior to the DTA evaluation. FIG. 8 presents the data. The DTA pattern shown at the top in FIG. 8 shows that the titania gel crystallizes to rutile (via an anatase stage) at approximately 900° C. under the dynamic conditions of the DTA experiment. The most striking finding is that with 0.2% of rutile seeds, the diphasic xerogel transforms to rutile nearly 250° C. lower than the unseeded $TiO_2$ xerogel, as is shown in the bottom curve of FIG. 8.

The DTA curves for higher concentrations of seeds show that there is virtually no further effect after approximately 0.2%. It appears that seeding profoundly alters reaction and sintering of rutile ceramics.

1.2 The System Al$_2$O$_3$

Figure 9:
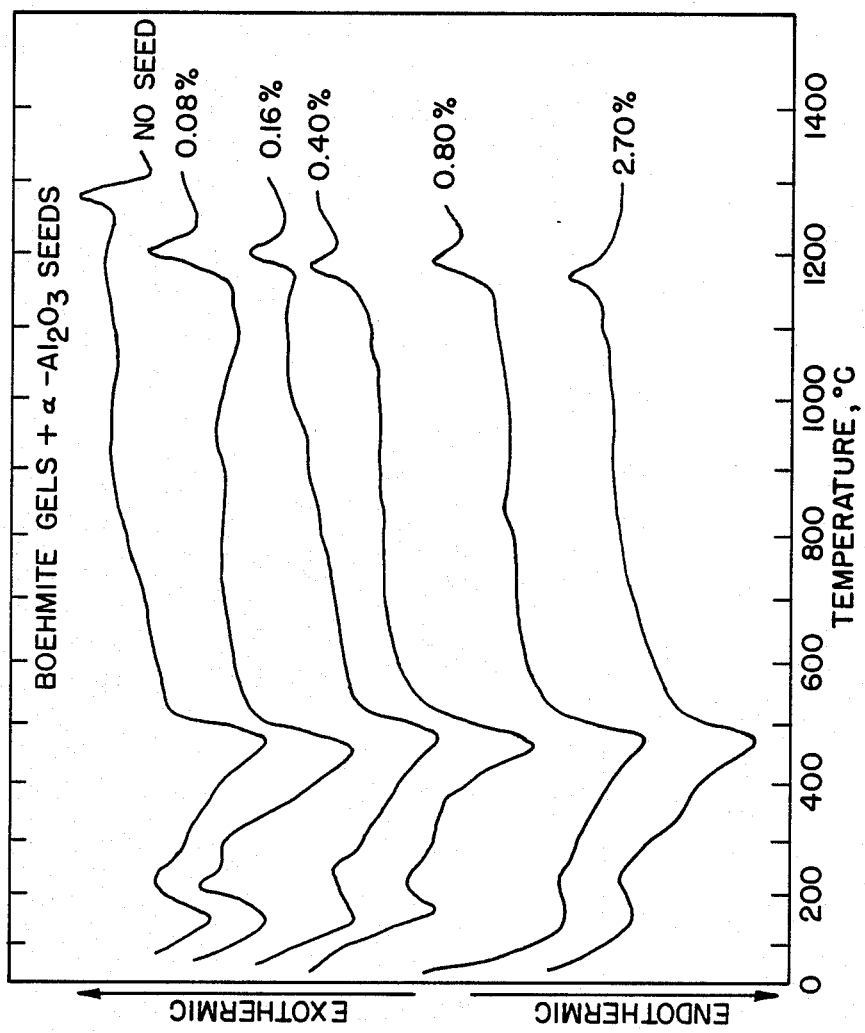
FIGS. 9 and 11 are DTA heating curves of $Al_2O_3$ diphasic xerogels.

A series of alumina xerogels was prepared from a boehmite (AlOOH) sol (~10 nm particle), by mixing therewith a sol of α-Al$_2$O$_3$ seeds (~100 nm). The resulting sol was gelled and dried to provide a series of diphasic gels containing varying amounts of α-Al$_2$O$_3$ seeds. The results comparing the unseeded and seeded gels with increasing wt. %'s of corundum seeds by DTA evaluation are shown in FIG. 9. These data are parallel to the TiO$_2$ data with a marked (~150° C.) lowering of the θ-α transformation exotherm from 1280° to 1150° C. with the addition of only 0.1% seeds. Higher concentrations did not significantly lower the θ-α monotropic transformation further.

Figure 10A:
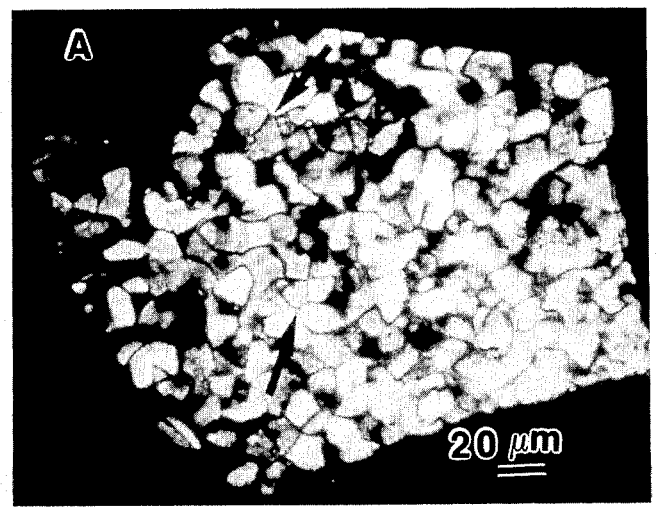
FIGS. 10A and 10B are microphotographs of $Al_2O_3$ xerogels.
Figure 10B:
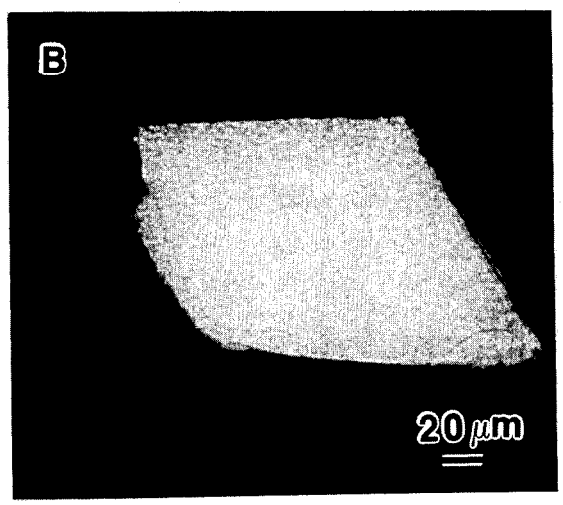

In a completely separate series of experiments a similar boehmite sol was quickly gelled by evaporation and thin layers of the xerogel heated to 1150° C. for 30 minutes. The α-Al$_2$O$_3$ crystals which formed from what were originally 10 nm grains were 10–15 μm in diameter. FIG. 10A shows them in polarized light. When the boehmite sol was seeded with the sol of 0.2% α-Al$_2$O$_3$ seeds and the experiment repeated, no large crystals could be found at all (FIG. 10B), the grain size was submicron and could not be discerned optically.

Figure 11:
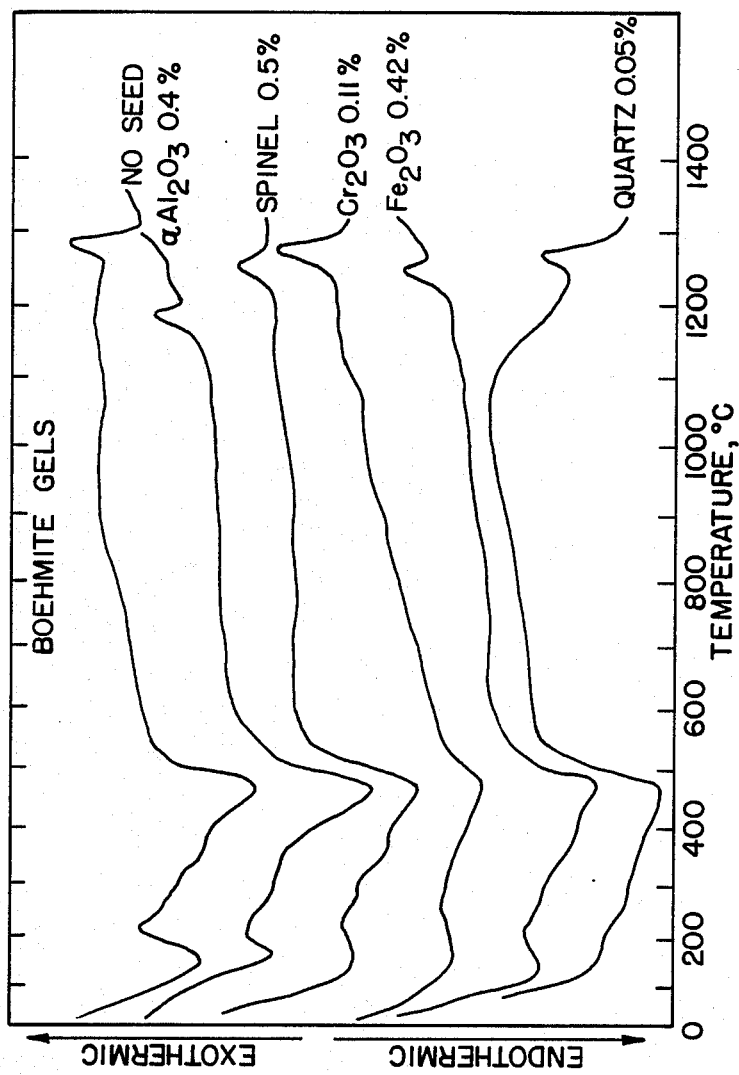

The existence of hetero-homo and hetero-hetero epitaxy effects in diphasic xerogel-derived ceramics was evaluated by the addition of sols of crystalline seeds of α-alumina and crystalline seeds isostructural with α-Al$_2$O$_3$ (i.e., Fe$_2$O$_3$[corundum] and Cr$_2$O$_3$[corundum] to boehmite sols, and subsequent gelling. In order to check whether the effects being found were, in fact, structural epitaxy and not colloidal phenomena, sols of SiO$_2$ [quartz] seeds, and MgAl$_2$O$_4$ seeds were also added to boehmite sols. The sols were gelled and dried to provide a series of diphasic xerogels. The DTA heating curves of this series of diphasic xerogels are presented in FIG. 11. The quartz (see FIG. 11) shows no effect on the θ-α transition, and while Fe$_2$O$_3$ does show a lowering of 30° C., the Cr$_2$O$_3$ shows hardly any. The lattice mismatch with Fe$_2$O$_3$ is 5.86% and with Cr$_2$O$_3$ is 4.56% for the C parameter. The α-alumina provides the largest effect on the θ-α transition, lowering the sintering temperature by about 150° C.

What is claimed is:

1. A process of preparing a ceramic oxide of rutile which comprises:
   (a) combining a first ceramic oxide sol of noncrystalline TiO$_2$ with a second ceramic oxide sol of rutile (crystalline TiO$_2$) to form an inhomogenous sol, said first ceramic oxide being structurally dissimilar to and compositionally the same as said second ceramic oxide, said first ceramic oxide sol comprising a major portion and said second ceramic oxide sol comprising a minor portion of said inhomogenous sol, said minor portion being 0.02 to less than 5 wt. % of the single phase crystalline ceramic oxide of step (d) herein and effective to convert the major portion to crystalline TiO$_2$ in step (d) herein and said first sol and said second sol being effective to form an inhomogenous sol;
   (b) converting said inhomogenous sol under conditions effective to provide an inhomogenous gel, said effective converting conditions including room temprature to 70° C. in an open system for several minutes to several hours or in a closed system for one-half hour to several days;
   (c) drying said gel under conditions effective to provide a structurally diphasic xerogel, said effective drying conditions including ambient temperature for several hours to 3 days, an oven at about 110° to about 125° C. for about 30 minutes, a microwave oven for several minutes or a reducing furnace at about 200° to about 700° C. for about 10 minutes; and
   (d) sintering said structurally diphasic xerogel under conditions effective to provide a single phase crystalline ceramic oxide of rutile, said effective sintering conditions including a temperature in the range of 700°–1650° C.

* * * * *

UNITED STATES PATENT AND TRADEMARK OFFICE
CERTIFICATE OF CORRECTION

PATENT NO. : 4,829,031

DATED : May 9, 1989

INVENTOR(S) : Rustum Roy, et al.

It is certified that error appears in the above-identified patent and that said Letters Patent is hereby corrected as shown below:

Column 2, line 26: "oide-based" should read as --oxide-based--

Column 2, line 28: "crystal lites" should read as --crystallites--

Column 3, lines 54-55: "DESCRIPTION OF THE PREFERRED EMBODIMENTS" should read as --BRIEF DESCRIPTION OF THE DRAWINGS--

Column 5, lines 46-49:

"AlOOH (Boehmite)     $-Al_2O_3$ "

$\alpha Al_2O_3$   MgO     $-Al_2O_3$ $\alpha Al_sO_3$   MgO     $MgAl_sO_4$ $TiO_s$ (Amorphous)     $TiO_2$ (Rutile)

should read as:

--AlOOH (Boehmite)     $\alpha$-$Al_2O_3$ --

$Al_2O_3 \cdot MgO$     $\alpha$-$Al_2O_3$ $Al_sO_3 \cdot MgO$     $MgAl_2O_4$ $TiO_2$ (Amorphous)     $TiO_2$ (Rutile)

UNITED STATES PATENT AND TRADEMARK OFFICE
CERTIFICATE OF CORRECTION

PATENT NO. : 4,829,031
DATED : May 9, 1989
INVENTOR(S) : Rustum Roy, et al.

It is certified that error appears in the above-identified patent and that said Letters Patent is hereby corrected as shown below:

Column 7, line 16: "crstals" should read as --crystals--

Column 8, line 25: "fitered" should read as --filtered--

Column 11, line 2: "sllution" should read as --solution--

Column 11, line 6: "$\alpha$-Al O" should read as --$\alpha$-Al$_2$O$_3$--

Signed and Sealed this

Seventeenth Day of April, 1990

Attest:

HARRY F. MANBECK, JR.

Attesting Officer     Commissioner of Patents and Trademarks